(12) United States Patent
Fukushima (10) Patent No.: US 8,107,405 B2
(45) Date of Patent: Jan. 31, 2012

(54) RADIO COMMUNICATION TERMINAL

(75) Inventor: Masaru Fukushima, Yokohama (JP)

(73) Assignee: Kyocera Corporation, Kyoto (JP)

( * ) Notice: Subject to any disclaimer, the term of this patent is extended or adjusted under 35 U.S.C. 154(b) by 706 days.

(21) Appl. No.: 12/280,530

(22) PCT Filed: Feb. 23, 2007

(86) PCT No.: PCT/JP2007/053396
§ 371 (c)(1),
(2), (4) Date: Dec. 24, 2008

(87) PCT Pub. No.: WO2007/097420

PCT Pub. Date: Aug. 30, 2007

(65) Prior Publication Data

US 2009/0219859 A1    Sep. 3, 2009

(30) Foreign Application Priority Data

Feb. 24, 2006   (JP) ................... 2006-049059
Apr. 13, 2006   (JP) ................... 2006-111298

(51) Int. Cl.
*H04B 7/00* (2006.01)
(52) U.S. Cl. ........................ 370/310; 455/403
(58) Field of Classification Search ........................ None
See application file for complete search history.

(56) References Cited

U.S. PATENT DOCUMENTS

| 6,798,872 B1 | 9/2004 | Matsumoto et al. ..... 379/142.01 |
| 2005/0143103 A1* | 6/2005 | Bjorgan et al. ............... 455/466 |

FOREIGN PATENT DOCUMENTS

| JP | 08-274895 | 10/1996 |
| JP | 2000-092192 | 3/2000 |
| JP | 2001-186240 | 7/2001 |
| JP | 2003-188992 | 7/2003 |
| JP | 2003-218995 | 7/2003 |

OTHER PUBLICATIONS

J. Rosenberg, et al. "SIP: Session Initiation Protocol" RFC 3261, pp. 1-240, Jun. 2002.

* cited by examiner

*Primary Examiner* — Kevin C Harper
(74) *Attorney, Agent, or Firm* — DLA Piper LLP (US)

(57) ABSTRACT

A radio communication terminal according to the present invention comprises: a call request transmitter configured to transmit a call request for a destination terminal to a call control server; an input information acquisition unit configured to acquire inputted information; a message creation unit configured to create a message for the destination terminal on the basis of the information acquired by the input information acquisition unit; a starting unit configured to start the message creation unit during a period from when the call request transmitter transmits the call request until the communication path is set; and a message transmitter configured to transmit the message created by the message creation unit to the destination terminal.

7 Claims, 6 Drawing Sheets

RADIO COMMUNICATION TERMINAL

CROSS-REFERENCE TO THE RELATED APPLICATIONS

This application is a national stage of international application No. PCT/JP2007/053396 filed Feb. 23, 2007, which also claims benefit of priority under 35 USC 119 to Japanese Patent Application No. 2006-049059 filed Feb. 24, 2006 and Japanese Patent Application No. 2006-111298 filed Apr. 13, 2006, the entire contents of all of which are incorporated herein by reference.

TECHNICAL FIELD

The present invention relates to a radio communication terminal that performs IP packet communications in a radio communication network with a destination terminal to be called after completion of a login process to a call control server, by use of a communication path set by the call control server between the radio communication terminal and the destination terminal.

BACKGROUND ART

Heretofore, SIP (Session Initiation Protocol) (refer to RFC3261 "SIP: Session Initiation Protocol") has been used as a call control protocol when radio communication terminals perform IP packet communications in a radio communication network.

A call control by SIP is performed via an SIP server (a call control server). Specifically, a SIP server receives a call request (INVITE Request) for a destination radio communication terminal (hereinafter, referred to as a destination terminal) from a call originating radio communication terminal (hereinafter, referred to as an originating terminal). After the completion of a login process of the destination terminal, the SIP server transmits the call request from the originating terminal for the destination terminal. Thereafter, a communication path between the destination terminal and the originating terminal is set by the SIP server, and then the call (IP packet communications) is executed by use of the communication path.

DISCLOSURE OF THE INVENTION

Under the call control by SIP, a SIP server cannot transmit a call request (INVITE Request) for a destination terminal to the destination terminal until the login process to the SIP server by the destination terminal is completed.

For this reason, in comparison with a call control by a line switching system, the call control by SIP requires long period of time from when an originating terminal issues a call request for a destination terminal until a communication path is set. Specifically, there is a problem that information cannot be transmitted promptly since it takes a long time until a communication path is set even when a user of an originating terminal intends to transmit information to a user of a destination terminal urgently.

In addition, in a case where a communication path cannot be set, the user of the originating terminal has to start an application such as a short message service or an E-MAIL, where the response notification receiver receives the response notification, the message transmitter (notification message transmitter (SIP) 140) transmits the message to the call control server before the communication path is set.

In this respect, the present invention is made in view of the aforementioned circumstance. An object of the present invention is thus to provide, in a radio communication network, a radio communication terminal that enables an improvement in usability of a user of an originating terminal by allowing information to be transmitted promptly to a user of a destination terminal in a case where the radio communication terminal performs IP packet communications with a destination terminal by use of a communication path set by a call control server between the radio communication terminal and the destination terminal to be called upon completion of a login process to the call control server.

A first aspect of the present invention is summarized as a radio communication terminal that performs IP packet communications in a radio communication network with a destination terminal to be called after completion of a login process to a call control server (SIP server 300), by use of a communication path set by the call control server between the radio communication terminal and the destination terminal. The radio communication terminal comprises: a call request transmitter (call control processor 110) configured to transmit a call request for the destination terminal to the call control server; an input information acquisition unit (operation unit 190) configured to acquire inputted information; a message creation unit (notification message creation unit 120) configured to create a message (notification message) for the destination terminal on the basis of the information acquired by the input information acquisition unit; a starting unit (controller 170) configured to start the message creation unit during a period from when the call request transmitter transmits the call request until the communication path is set; and a message transmitter configured to transmit the message created by the message creation unit to the destination terminal (a notification message transmitter (SMS/E-MAIL) 130, a notification message transmitter (SIP) 140 and a notification message transmitter (between the terminals) 150).

According to the aspect, information can be promptly transmitted to the user of the destination terminal since the starting unit starts the message creation unit immediately after the transmission of the call request by the call request transmitter, and the message for the destination terminal is thus created promptly. In addition, since the starting unit starts the message creation unit, the user of the radio communication terminal does not have to re-start an application, to specify the address of the destination terminal, or to do other operations again for editing and transmitting the message. The usability of the user of the radio communication terminal can be thus improved.

The radio communication terminal of the first aspect of the invention may further comprise a receiver (call control processor 110) configured to receive a non-response notification of the destination terminal for the call request, wherein in a case where the receiver receives the non-response notification, the message transmitter (notification message transmitter (SMS/E-MAIL) 130) creates a message addressed to the destination terminal and transmits the created message to a distribution server.

The radio communication terminal of the first aspect of the invention may further comprise a cancellation request receiver (operation unit 190) configured to receive a cancellation request that requests cancellation of the call request, wherein in a case where the cancellation request receiver receives the cancellation request, the message transmitter (notification message transmitter (SMS/E-MAIL) 130) creates a message addressed to the destination terminal and transmits the created message to a distribution server.

The radio communication terminal of the first aspect of the invention may further comprise a response notification receiver (call control processor 110) configured to receive a response notification indicating a response process of the destination terminal for the call request, wherein in a case where the login completion receiver receives the login completion notification, the message transmitter (notification message transmitter (SIP) 140) transmits the message to the call control server before the communication path is set.

The radio communication terminal of the first aspect of the invention may further comprise a communication path setting detector (controller 170) configured to detect that the communication path is set, wherein in a case where the communication path setting detector detects that the communication path is set, the message transmitter (notification message transmitter (between terminals) 150) transmits the message to the destination terminal by use of the communication path.

The radio communication terminal of the first aspect of the invention may further comprise: a communication path setting detector (controller 170) configured to detect that the communication path is set; and a message deletion unit (notification message deletion unit 160) configured to delete the message in a case where the communication path setting detector detects that the communication path is set.

In the radio communication terminal of the first aspect of the invention, the call request transmitter transmits a call request for a plurality of the destination terminals, and the message transmitter may create a message addressed to a destination terminal that has not responded to the call request among the destination terminals to which the call request transmitter transmits the call request and then transmit the created message to a distribution server.

According to the aspect of the present invention, it is possible to provide, in a radio communication network, a radio communication terminal that enables an improvement in usability of a user of an originating terminal by allowing information to be transmitted promptly to a user of a destination terminal in a case where the radio communication terminal performs IP packet communications with a destination terminal by use of a communication path set, by a call control server, between the originating terminal and the destination terminal to be called upon completion of a login process to a call control server.

BEST MODE FOR CARRYING OUT THE INVENTION

Schematic Configuration of Radio Communication Network

A description will be given of a schematic configuration of a radio communication network according to the embodiment with reference to FIG. 1.

In this description, an assumption is made that IP packet communications include VoIP (Voice over IP) communications between each terminals, non-voice communications such as chatting, and furthermore, communications formed by merging voice communications such as TV phone communications or TV conference communications with non-voice communications.

Figure 1:
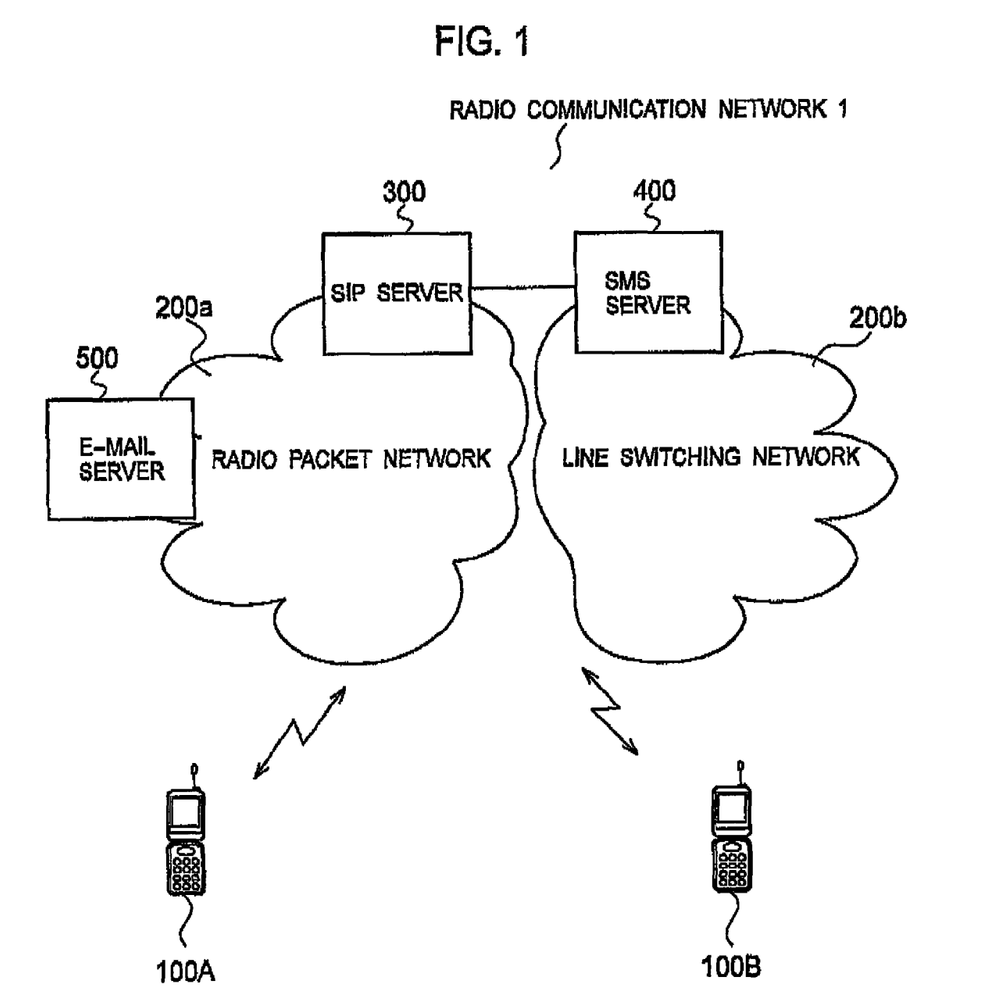
FIG. 1 shows an overall schematic configuration diagram of a radio communication network according to an embodiment of the present invention.

As shown in FIG. 1, a radio communication network 1 includes a SIP server 300, an SMS (Short Message Service) server 400 and an E-MAIL server 500. Furthermore, radio communication terminals 100A and 100B according to the present embodiment are configured to be connectable with the SIP server 300 and the E-MAIL server 500 via a radio packet network 200a transmitting IP packets. The radio communication terminals 100A and 100B are configured to be connectable with the SMS server 400 via a line switching network 200b. It should be noted that the E-MAIL server 500 may be configured to be connectable via the line switching network 200b.

Hereinafter, the description will be given under the assumption that the radio communication terminal 100A is an originating terminal, and the radio communication terminal 100B is a destination terminal in this description.

The SIP server 300 is a call control server that performs a call control for the radio communication terminals 100A and 100B on the basis of SIP. Specifically, the SIP server 300 manages identification information (a phone number, an IP address or the like, for example) of the radio communication terminals 100A and 100B through login processes. In addition, the SIP server 300 controls a setting of a communication path for performing IP packet communications mutually between the radio communication terminals 100A and 100B having completed the login processes.

The SMS server 400 provides a message service (a short message service). The SMS server 400 relays a short message received from the radio communication terminal 100A being addressed to the radio communication terminal 100B, and transmits it to the radio communication terminal 100B. In addition, in a case where the radio communication terminal 100B can not receive the short message, the SMS server 400 can re-transmit the short message a predetermined number of times until the radio communication terminal 100B receives the short message. The SMS server 400 constitutes a distribution server in this embodiment.

The E-MAIL server 500 provides a message service (an E-MAIL service). The E-MAIL server 500 relays an E-MAIL message received from the radio communication terminal 100A being addressed to the radio communication terminal 100B, and transmits it to the radio communication terminal 100B. The E-MAIL server 500 constitutes a distribution server in this embodiment.

(Configuration of Radio Communication Terminal)

A configuration of the radio communication terminal 100A used in the radio communication network 1 will be described with reference to FIG. 2.

Figure 2:
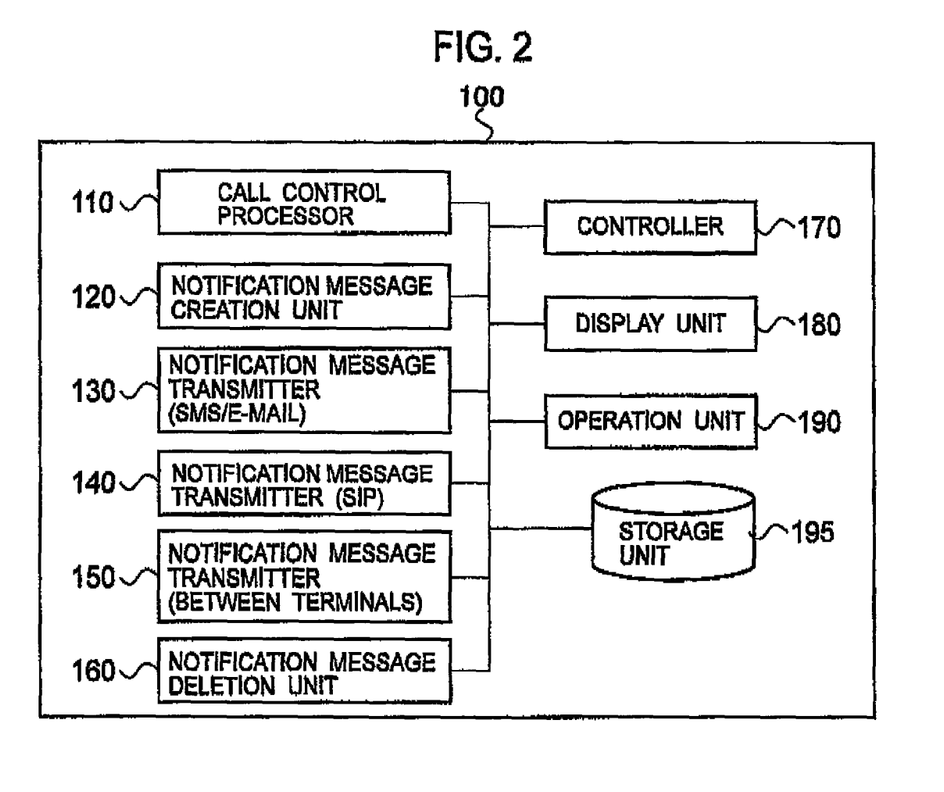
FIG. 2 shows a block configuration diagram of the radio communication terminal according to the embodiment of the present invention.

As shown in FIG. 2, the radio communication terminal 100 includes a call control processor 110, a notification message creation unit 120, a notification message transmitter (SMS/E-MAIL) 130, a notification message transmitter (SIP) 140, a notification message transmitter (between terminals) 150, a notification message deletion unit 160, a controller 170, a display unit 180, an operation unit 190 and a storage unit 195.

The radio communication terminal 100B includes the function block configuration similar to that of the radio communication terminal 100A.

Moreover, the description will be mainly given of portions related to the present invention, hereinafter. Accordingly, it is to be noted that there is a case where the radio communication terminal 100A includes a logical block which is essential to perform functions as the radio communication terminal 100A (such as a power supply) although such a logical block is not shown in the drawings, or the description thereof is omitted.

The call control processor 110 performs processing for setting a communication path used in IP packet communications performed mutually between terminals by use of SIP.

Specifically, the call control processor 110 transmits a call request (INVITE Request) for the radio communication terminal 100B to the SIP server 300. The call control processor 110 constitutes a call request transmitter in this embodiment. Incidentally, the call control processor 110 is allowed to transmit call requests (INVITE Requests) for multiple radio communication terminals 100 to the SIP server 300.

In addition, the call control processor 110 receives a non-response notification indicating that a response process of the radio communication terminal 100B has not been performed with respect to the SIP server 300. The call control processor 110 constitutes a receiver in this embodiment.

Moreover, the call control processor 110 receives an in-process notification (100 Trying, for example) indicating that the response process with respect to the SIP server 300 is completed. The call control processor 110 constitutes a response notification receiver in this embodiment.

Figure 3:
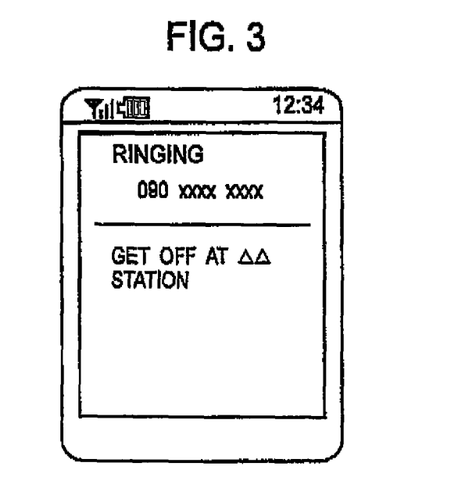
FIG. 3 is a diagram showing an example of a notification message creation screen displayed by a radio communication terminal according to the embodiment of the present invention.

The notification message creation unit 120 creates a notification message creation screen as shown in FIG. 3 for example, in response to an instruction from the controller 170, and causes the created notification message creation screen to be displayed on the display unit 180. In addition, the notification message creation unit 120 creates a notification message (a message) for the radio communication terminal 100B on the basis of information acquired from the operation unit 190 while causing the notification message creation screen to be displayed on the display unit 180. The notification message creation unit 120 constitutes a message creation unit in this embodiment.

The notification message transmitter (SMS/E-MAIL) 130 creates a message addressed to the radio communication terminal 100B in response to an instruction from the controller 170 and transmits the created message to a distribution server. The notification message transmitter (SMS/E-MAIL) 130 constitutes a message transmitter in this embodiment.

Specifically, the notification message transmitter (SMS/E-MAIL) 130 creates, in the form of a short message service, the notification message created by the notification message creation unit 120, then sets a destination of the message and transmits the message to the SMS server 400.

In addition, the notification message transmitter (SMS/E-MAIL) 130 creates a notification message by the notification message creation unit 120 in the form of an E-MAIL service, then sets a destination of the message and transmits the notification message to the E-MAIL server 500.

It should be noted that the notification message transmitter (SMS/E-MAIL) 130 is allowed to create a message addressed to the radio communication terminal 100, that has not responded to the call request, among the multiple radio communication terminals 100 to which the call control processor 110 has transmitted call requests (INVITE Request), and then to transmit the created message to a distribution server.

In response to an instruction from the controller 170, the notification message transmitter (SIP) 140 transmits a notification message created by the notification message creation unit 120 to the SIP server 300 on the basis of SIP. The notification message transmitter (SIP) 140 constitutes a message transmitter in this embodiment.

The notification message transmitter (between terminals) 150 transmits the notification message created by the notification message creation unit 120 to the radio communication terminal 100B by use of a session (communication path) set for the radio communication terminal 100B by the call control processor 110. The notification message transmitter (between terminals) 150 constitutes a message transmitter in this embodiment.

The notification message deletion unit 160 deletes a notification message created by the notification message creation unit 120. The notification message deletion unit 160 constitutes a message deletion unit in this embodiment.

The controller 170 controls each function block of the radio communication terminal 100.

Specifically, the controller 170 starts the notification message creation unit 120 when the call control processor 110 transmits a call request (INVITE Request) for the radio a communication terminal 100B to the SIP server 300. The controller 170 constitutes a starting unit in this embodiment.

In addition, the controller 170 starts the notification message transmitter (SMS/E-MAIL) 130 in a case where the call control processor 110 receives a non-response notification.

The controller 170 starts the notification message transmitter (SMS/E-MAIL) 130 in a case where the operation unit 190 receives a cancellation request for the call request (INVITE Request) for the radio communication terminal 100B.

The controller 170 starts the notification message transmitter (SIP) 140 in a case where the call control processor 110 receives an in-process notification indicating the completion of a login process to the SIP server 300 for the radio communication terminal 100B.

The controller 170 detects that a session (communication path) with the radio communication terminal 100B is set by the call control processor 110. The controller 170 constitutes a communication path setting detector in this embodiment.

The controller 170 starts the notification message transmitter (between terminals) 150 in a case where the controller 170 detects that a session (communication path) with the radio communication terminal 100B is set by the call control a processor 110.

The display unit 180 is configured of a small display device and displays various information. Specifically, the display unit 180 displays a notification message creation screen created by the notification message creation unit 120.

The operation unit 190 is configured of various types of key and a vibrator, which are operated by the user of the radio communication terminal 100.

Specifically, the operation unit 190 acquires information inputted by the user on the notification message creation screen displayed on the display unit 180. The operation unit 190 constitutes an input information acquisition unit in this embodiment.

In addition, the operation unit 190 receives a cancellation request that requests for cancellation of a call request (INVITE Request) for the radio communication terminal 100B. The operation unit 190 constitutes a cancellation request receiver in this embodiment.

A storage unit 195 stores an address book including a phone number or an E-MAIL address of the radio communication terminal 100B.

(Communication Method)

Hereinafter, a communication method according to the present embodiment will be described with reference to FIGS. 4 to 8.

Hereinafter, an assumption is made that the radio communication terminal 100A is referred to as an originating terminal #A, and the radio communication terminal 100B is referred to as a destination terminal #B.

(1) Pattern 1

Figure 4:
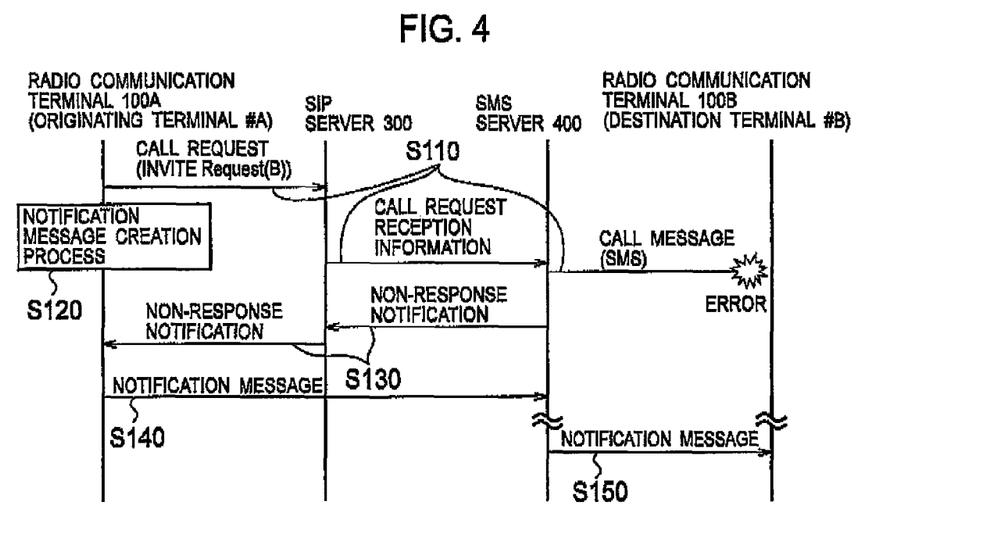
FIG. 4 is a sequence diagram showing a communication method (pattern 1) according to the embodiment of the present invention.

FIG. 4 shows an example of transmission of a notification message in a case where a login process of the destination terminal #B to the SIP server 300 in response to a call request for the destination terminal #B is not performed, the call request being transmitted by the originating terminal #A.

As shown in FIG. 4, in step S110, the originating terminal #A transmits a call request (INVITE Request (B)) for the destination terminal #B to the SIP server 300. It is to be noted that the call request (INVITE Request (B)) for the destination terminal #B includes identification information of the destination terminal #B (such as a phone number).

The SIP server 300 transmits reception information of a call request to the SMS server 400, the information indicating that the call request (INVITE Request (B)) addressed to the destination terminal #B is received from the originating terminal #A.

The SMS server 400 creates a call message (SMS) for the destination terminal #B on the basis of the reception information of the call request from the SIP server 300 and transmits the message to the destination terminal #B. It is to be noted that the call message (SMS) includes identification information of the SIP server 300 (such as an IP address).

In step S120, the originating terminal #A performs a notification message creation processing immediately after transmitting the call request (INVITE Request (B)) for the destination terminal #B to the SIP server 300. Specifically, the originating terminal #A creates a notification message creation screen and causes the created notification message creation screen to be displayed on the display unit 180. The originating terminal #A creates a notification message for the destination terminal #B on the basis of the information acquired from the operation unit 190 while the notification message creation screen is displayed.

In step S130, the SMS server 400 detects that the destination terminal #B has not responded to the call message (SMS) for the destination terminal #B transmitted in step S110 and notifies the SIP server 300 that the destination terminal #B has not responded to the call message (SMS) for the destination terminal #B.

The SIP server 300 transmits a non-response notification to the originating terminal #A, the notification indicating that the destination terminal #B has not responded to the call message (SMS) and that the login process of the destination terminal #B to the SIP server 300 is not performed.

In step S140, the originating terminal #A transmits the notification message created in step S120 to the SMS server 400 by use of a short message service.

In step S150, the SMS server 400 transmits the received notification message to the destination terminal #B by use of a short message service. By use of the short message service, the SMS server 400 can re-transmit the notification message a predetermined number of times until the destination terminal #B receives the notification message.

Accordingly, even in a case where the destination terminal #B cannot receive the notification message since the destination terminal #B is out of the communication coverage area, the destination terminal #B can receive the notification message when the destination terminal #B moves and enters into the communication coverage area by the retransmission of the message.

(2) Pattern 2

Figure 5:
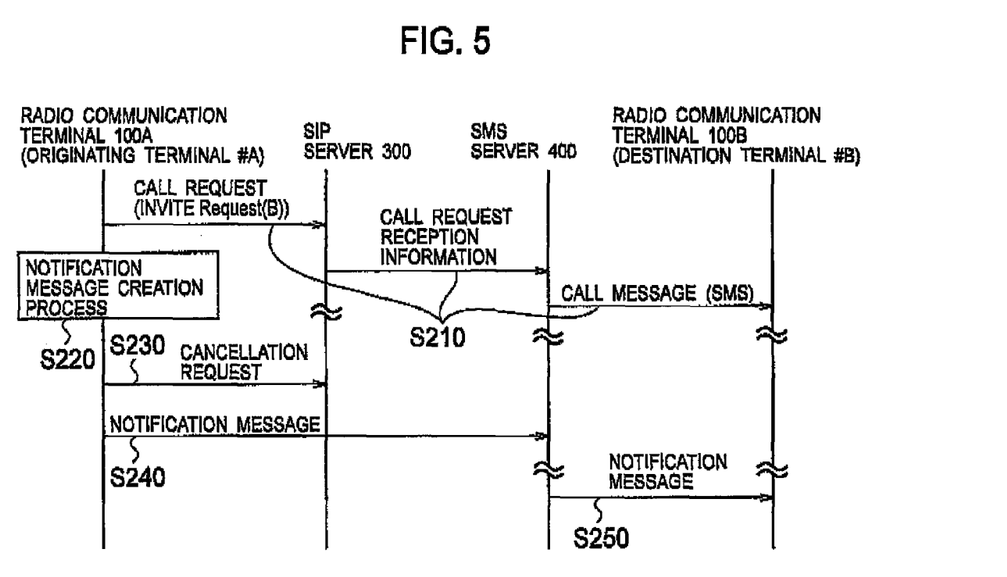
FIG. 5 is a sequence diagram showing the communication method (pattern 2) according to the embodiment of the present invention.

FIG. 5 shows an example of transmission of a notification message in a case where a call request for the destination terminal #B transmitted by the originating terminal #A is cancelled. Here, the description of steps S210 and S220 is omitted since the steps are similar to steps S110 and S120 in FIG. 4.

As shown in FIG. 5, in step S230, in a case where a user of the originating terminal #A requests for cancellation of the call request for the destination terminal #B, the originating terminal #A transmits a cancellation request for the call request for the destination terminal #B to the SIP server 300.

In step S240, the originating terminal #A transmits a notification message created in step S220 to the SMS server 400 by use of a short message service.

In step S250, the SMS server 400 transmits the received notification message to the destination terminal #B by use of a short message service as in the case of step S150 in FIG. 4.

(3) Pattern 3

Figure 6:
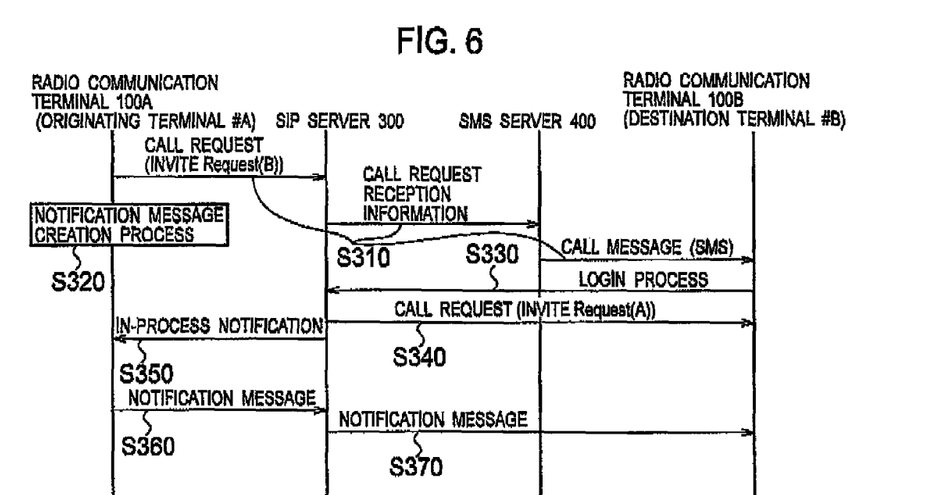
FIG. 6 is a sequence diagram showing the communication method (pattern 3) according to the embodiment of the present invention.

FIG. 6 shows an example of transmission of a notification message in a case where the destination terminal #B completes the login process to the SIP server 300 in response to a call request for the destination terminal #B transmitted by the originating terminal #A. Here, the description of steps S310 and S320 is omitted since the steps are similar to steps S110 and S120 in FIG. 4.

As shown in FIG. 6, the destination terminal #B receives a call message (SMS) from the SMS server 400 and performs a login process to the SIP server 300 in step S330.

In step S340, upon completion of the login process of the destination terminal #B, the SIP server 300 creates a call request (INVITE Request (A)) for the destination terminal #B on the basis of the call request (INVITE Request (B)) for the destination terminal #B received in step S310 and transmits the created request to the destination terminal #B.

In step S350, the SIP server 300 transmits to the originating terminal #A an in-process notification indicating that the login process of the destination terminal #B is completed.

In step S360, the originating terminal #A having received the in-process notification from the SIP server 300 transmits a notification message created in step S320 to the SIP server 300 on the basis of SIP.

In step S370, the SIP server 300 transmits the received notification message to the destination terminal #B on the basis of Sip. Accordingly, the destination terminal #B can notify the user of the contents of the received notification message while calling (while Ringing) the user.

(4) Pattern 4

Figure 7:
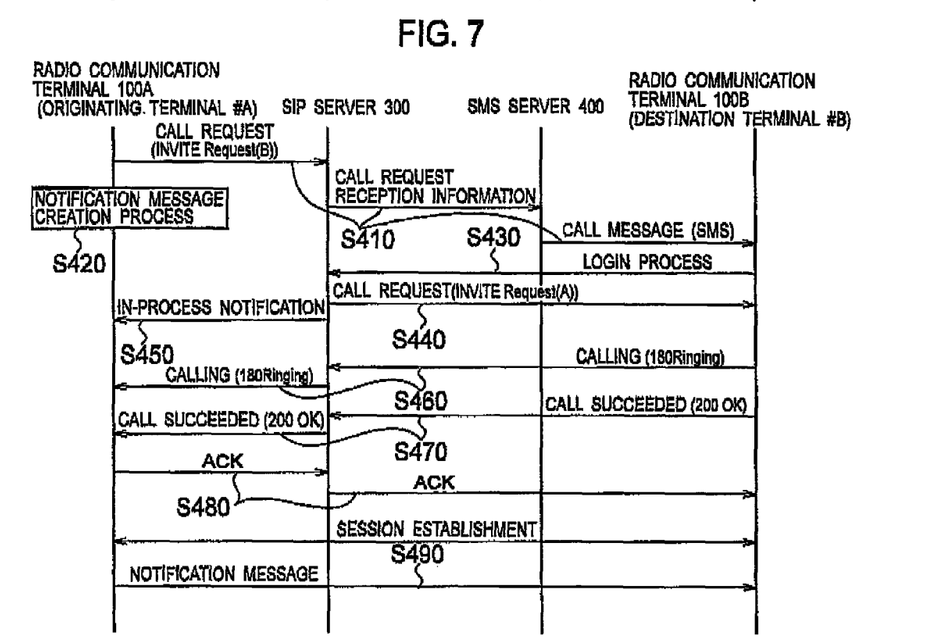
FIG. 7 is a sequence diagram showing the communication method (pattern 4) according to the embodiment of the present invention.

FIG. 7 shows an example of transmission of a notification message in a case where a session (communication path) for performing IP packet communications mutually between the originating terminal #A and the destination terminal #B is set. Here, the description of steps S410 to S450 is omitted since the steps are similar to steps S310 to S350 in FIG. 6.

As shown in FIG. 7, in step S460, the destination terminal #B transmits, to the originating terminal #A via the SIP server 300, a calling (180 Ringing) indicating that the destination terminal #B is calling the user of the destination terminal #B by ringtone, vibration or the like.

In step S470, the destination terminal #B transmits, to the originating terminal #A via the SIP server 300, a call succeeded (200 OK) indicating that the call to the user has been succeeded.

In step S480, the originating terminal #A transmits, to the destination terminal #B via the SIP server 300, ACK indicating that the call succeeded (200 OK) transmitted from the destination terminal #B is received. Here, a session for performing IP packet communications mutually between the originating terminal #A and the destination terminal #B is set.

In step S490, the originating terminal #A detects that the session between itself and the destination terminal #B is set. The originating terminal #A transmits a notification message created in step S420 to the destination terminal #B by use of the set session. Accordingly, the destination terminal #B can notify the user of the contents of the received notification message when the communications start.

(5) Pattern 5

Figure 8:
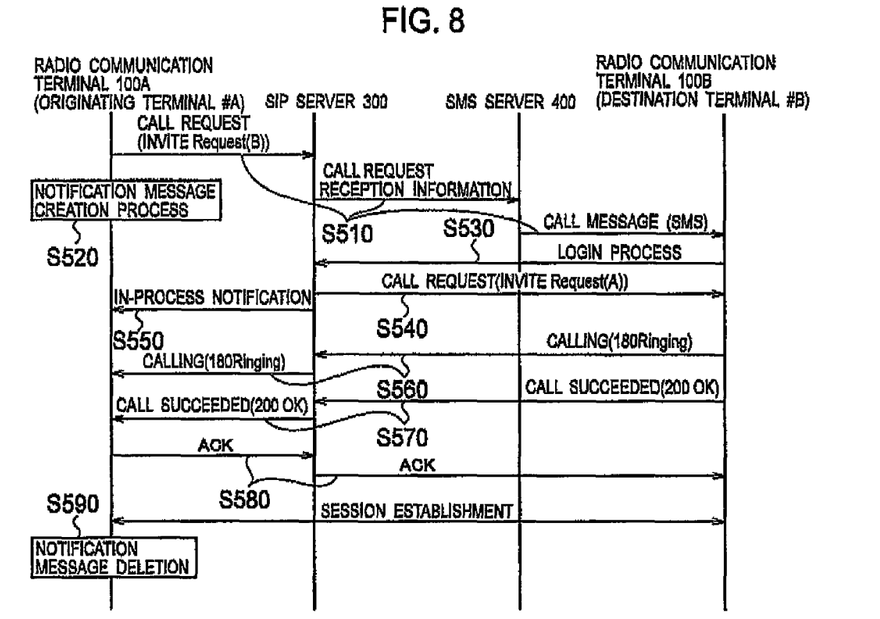
FIG. 8 is a sequence diagram showing the communication method (pattern 5) according to the embodiment of the present invention.

FIG. 8 shows an example of deleting a notification message in a case where a communication path to let the originating terminal #A and the destination terminal #B to communicate with each other is set. Here, the description of steps S510 to S580 is omitted since the steps are similar to steps S410 to S480 in FIG. 7.

In step S590, the originating terminal #A detects that a session between itself and the destination terminal #B is set, and thus deletes the notification message created in step S520.

Modification Example 1

In the aforementioned example of transmission of a notification message, it is described that the created notification message is transmitted to the SMS server 400 by use of a short message service in Pattern 1 (in a case where the login process of the destination terminal #B to the SIP server 300 is not performed) and Pattern 2 (in a case where the originating terminal #A cancels the call request for the destination terminal #B).

In a modification example 1 of the present invention, a description will be given of an example of transmitting the created notification message by selecting a short message service or an E-MAIL service in cases of Pattern 1 and Pattern 2.

Figure 9:
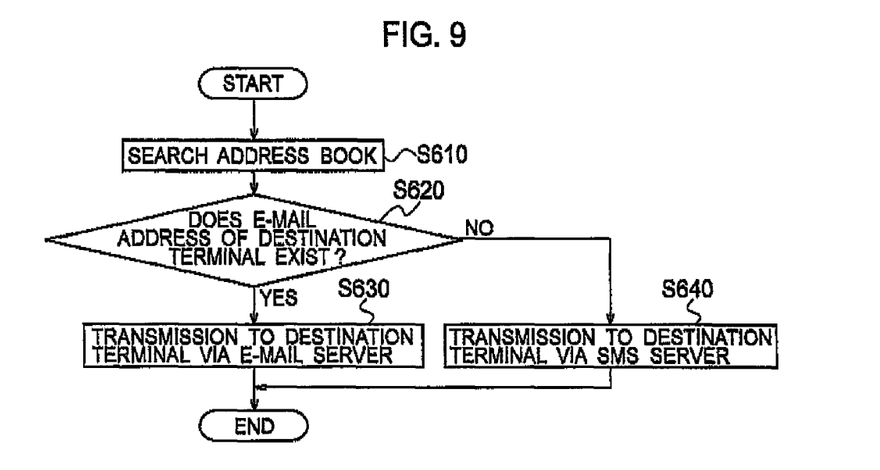
FIG. 9 is a flow chart showing a communication method according to a modification example 1 of the present invention.

FIG. 9 shows a flowchart indicating a processing for selecting a short message service or an E-MAIL service for transmitting a notification message when the notification message is transmitted.

In step S610, the originating terminal #A searches an address book stored in the storage unit 195.

In step S620, the originating terminal #A determines whether or not an E-MAIL address of the destination terminal #B is registered in the address book.

In a case where an E-MAIL address of the destination terminal #B is registered in the address book, the originating terminal #A sets the registered E-MAIL address of the destination terminal #B as the destination and transmits a notification message to the destination terminal #B via the E-MAIL server 500 by use of an E-MAIL service in step S630.

On the other hand, in a case where an E-MAIL address of the destination terminal #B is not registered in the address book, the originating terminal #A sets a phone number of the destination terminal #B as the destination and transmits a notification message to the destination terminal #B via the SMS server 400 by use of a short message service in Step S640.

Modification Example 2

In the aforementioned example of transmitting a notification message, described is a pattern in which a notification message is transmitted when an originating terminal #A calls a destination terminal #B.

In a modification example 2 of the present embodiment, a description will be given of an example of transmitting a notification message when an originating terminal #A calls multiple destination terminals (for example, a destination terminal #B, a destination terminal #C and the like). Specifically, the present invention can be applied to a group call in which an originating terminal communicates with multiple destination terminals.

Figure 10:
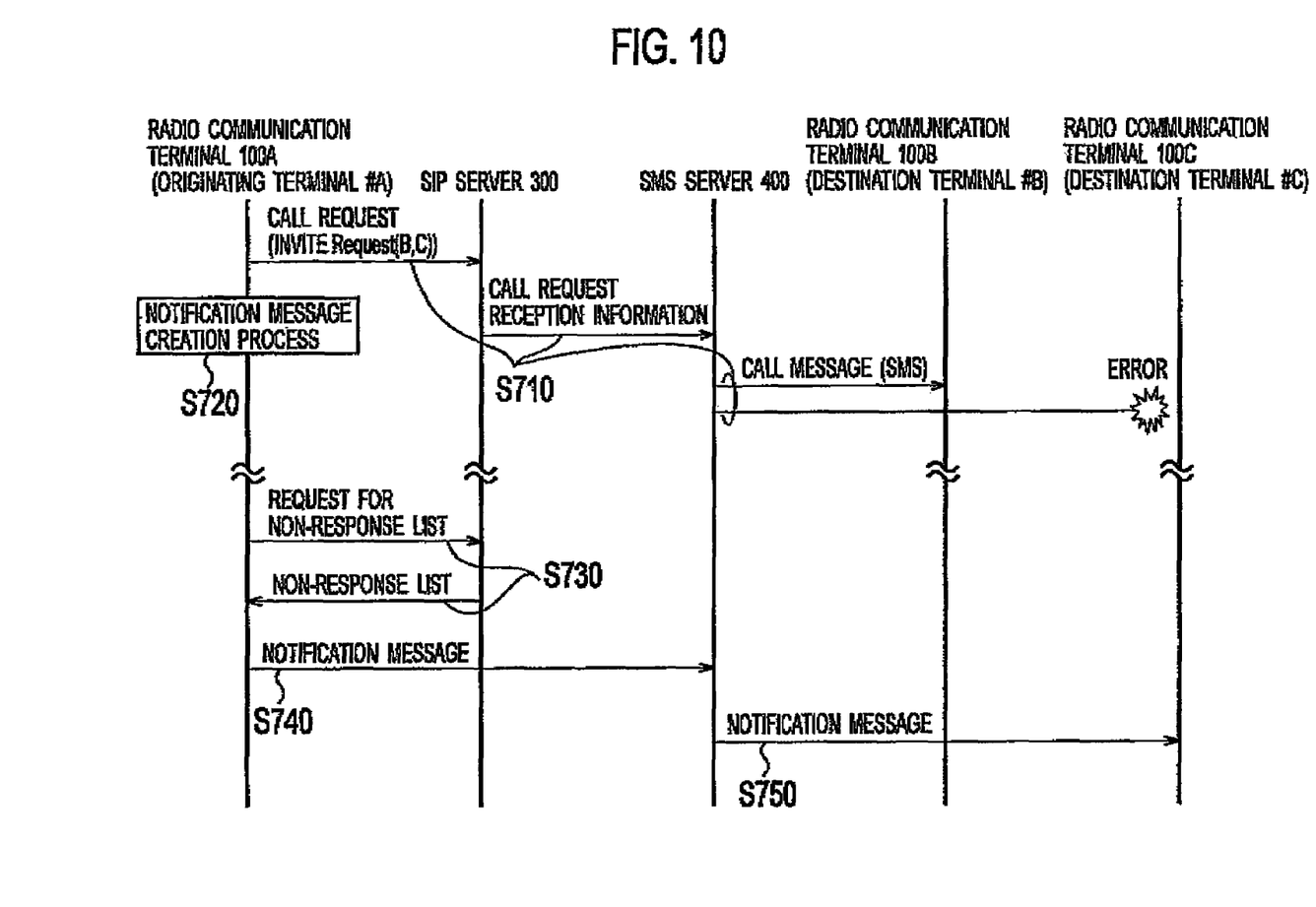
FIG. 10 is a sequence diagram showing a communication method according to a modification example 2 of the present invention.

In step S710, an originating terminal #A issues a call request (INVITE Request (B, C)) for a destination terminal #B and a destination terminal #C to the SIP server 300.

In step S720, the originating terminal #A performs the aforementioned notification message creation processing.

In step S730, the originating terminal #A issues a request for a non-response list to the SIP server 300. The SIP server 300 transmits a non-response list to the originating terminal #A in response to the request for a non-response list. The non-response list is a list of destination terminals that have not responded to the call request issued by the originating terminal #A (the destination terminal C, for example).

In step S740, the originating terminal #A transmits a notification message created in step S720 to the SMS server 400 on the basis of the non-response list received in Step S730.

In step S750, the SMS server 400 transmits a notification message to the destination terminal #C.

According to the aforementioned configuration, the message created for a destination terminal that has been unable to participate in the group call can be easily transmitted, and also the contents needed to be notified to the user of the destination terminal that has been unable to participate in the group call can be surely delivered.

EFFECTS AND ADVANTAGES

According to the originating terminal #A of the present embodiment, a notification message (message) to the destination terminal #B is promptly created by using a waiting time for calling a party since the controller 170 (starting unit) starts the notification message creation unit 120 (message creation unit) immediately after a call request (INVITE Request) is transmitted by the call control processor 110 (call request transmitter). Accordingly, the information can be promptly transmitted to the user of the destination terminal #B while the waiting time is effectively utilized. Moreover, since the controller 170 starts the notification message creation unit 120 (message creation unit) in response to a call process (call originating process), the user of the originating terminal #A does not have to re-start an application, to specify the address of the destination terminal #B, or to do other operations again for editing and transmitting the notification message. The usability of a user of the originating terminal #A can be thus improved.

According to the originating terminal #A of the present embodiment, even in a case where a login process of the destination terminal #B to the SIP server 300 (call control server) is not performed, or the destination terminal #B does not respond to the call due to a poor radio condition of the destination terminal #B, a notification message can be transmitted to the destination terminal #B via the SMS server 400 or the E-MAIL server 500 (a distribution server). In other words, the created message can be easily transmitted as an E-MAIL or a short mail to the destination terminal #B without re-starting an application for an E-MAIL service or a short message service and then inputting the message again.

According to the originating terminal #A of the present embodiment, even in a case where a call request (INVITE Request (B)) for the destination terminal #B is to be cancelled before a session (a communication path) with the destination terminal #B is set, that is, before the user of the originating terminal #A starts a call with the user of the destination terminal #B, the aforementioned effect can be brought about by transmitting the notification message to the destination terminal #B via the SMS server 400.

According to the originating terminal #A of the present embodiment, a notification message can be transmitted via the SIP server 300 in response to an in-process notification indicating that the login process of the destination terminal #B to the SIP server 300 is completed. The destination terminal #B can thus inform the user of the contents of the received notification message while calling (while Ringing) the user, and transmits the information to the user of the destination terminal #B promptly.

According to the originating terminal #A of the present embodiment, the originating terminal #A detects that a session (a communication path) between itself and the destination terminal #B is set. The originating terminal #A can thus transmit a notification message to the destination terminal #B by use of the session thus set. Accordingly, the destination terminal #B can inform the user of the contents of the received notification message when starting the communications with the originating terminal #A and transmit the information to the user of the destination terminal #B promptly.

In addition, according to the originating terminal #A of the present embodiment, when a session with the destination terminal #B is set, the contents of the notification message may be determined to be no longer necessary and thus deleted since the contents are to be delivered through a conversation by use of the set session.

Other Embodiments

Incidentally, although the description has been given of a case where SIP is used as the communication protocol in the present embodiment, the present invention is not limited to such a case. If a different communication protocol that can perform the operations in the present embodiment exists, the present invention can be applied to the case where the different communication protocol is used.

Moreover, in Pattern 4 of the aforementioned example of transmitting a notification message, the notification message can be transmitted as in the case of Pattern 1 even when the user of the destination terminal #B does not respond to the call.

Although the description of an example of the present invention has been provided above, the description merely exemplifies a specific example. The present invention thus should not be limited by the description. The specific configuration of each of the components or the like can be designed and modified as appropriate. In addition, the configurations of respective embodiments and the configurations of respective modification examples can be combined. Moreover, the effects and advantages of each of the embodiments and of the modification examples merely list most preferable effects and advantages produced from the present invention. The effects and advantages of the present invention thus should not be limited as the ones described in each of the embodiments or of the modification examples.

It is to be noted that the entire contents of Japanese Patent Application No. 2006-49059 (filed on Feb. 24, 2006) and Japanese Patent Application No, 2006-111298 (filed on Apr. 13, 2006) are incorporated herein by reference.

INDUSTRIAL APPLICABILITY

As described above, a radio communication terminal according to the present invention is advantageous in radio communications such as mobile communications. The radio communication terminal can improve usability of the user of an originating terminal since information can be promptly transmitted to the user of a destination terminal in the following case. Such a case is where the radio communication terminal performs IP packet communications in a radio communication network with the destination terminal by use of a communication path set by a call control server between the radio communication terminal and the destination terminal to be called upon completion of a login process to the call control server.

The invention claimed is:

1. A radio communication terminal that performs IP packet communications in a radio communication network with a destination terminal to be called after completion of a login process to a call control server, by use of a communication path set by the call control server between the radio communication terminal and the destination terminal, the radio communication terminal comprising:
   a call request transmitter configured to transmit a call request for the destination terminal to the call control server;
   an input information acquisition unit configured to acquire inputted information;
   a message creation unit configured to create a message for the destination terminal on the basis of the information acquired by the input information acquisition unit;
   a starting unit configured to start the message creation unit during a period from when the call request transmitter transmits the call request until the communication path is set; and
   a message transmitter configured to transmit the message created by the message creation unit to the destination terminal.

2. The radio communication terminal according to claim 1, further comprising a receiver configured to receive a non-response notification of the destination terminal for the call request, wherein
   in a case where the receiver receives the non-response notification, the message transmitter creates a message addressed to the destination terminal and transmits the created message to a distribution server.

3. The radio communication terminal according to claim 1, further comprising a cancellation request receiver configured to receive a cancellation request that requests cancellation of the call request, wherein in a case where the cancellation request receiver receives the cancellation request, the message transmitter creates a message addressed to the destination terminal and transmits the created message to a distribution server.

4. The radio communication terminal according to claim 1, further comprising a response notification receiver configured to receive a response notification indicating a response process of the destination terminal for the call request, wherein in a case where the response notification receiver receives the response notification, the message transmitter transmits the message to the call control server before the communication path is set.

5. The radio communication terminal according to claim 1, further comprising a communication path setting detector configured to detect that the communication path is set, wherein in a case where the communication path setting detector detects that the communication path is set, the message transmitter transmits the message to the destination terminal by use of the communication path.

6. The radio communication terminal according to claim 1, further comprising:

a communication path setting detector configured to detect that the communication path is set; and a message deletion unit configured to delete the message in a case where the communication path setting detector detects that the communication path is set.

7. The radio communication terminal according to claim 1, wherein the call request transmitter transmits a call request for a plurality of the destination terminals, and the message transmitter creates a message addressed to a destination terminal that has not responded to the call request among the destination terminals to which the call request transmitter transmits the call request, and transmits the created message to a distribution server.

* * * * *